S. F. MIOTON.
FLUID MEASURING MACHINE.
APPLICATION FILED JUNE 15, 1917.

1,382,439.

Patented June 21, 1921.
3 SHEETS—SHEET 1.

WITNESSES
Frederick Diehl,
E. B. Marshall

INVENTOR
S. F. Mioton
BY Munn & Co
ATTORNEYS

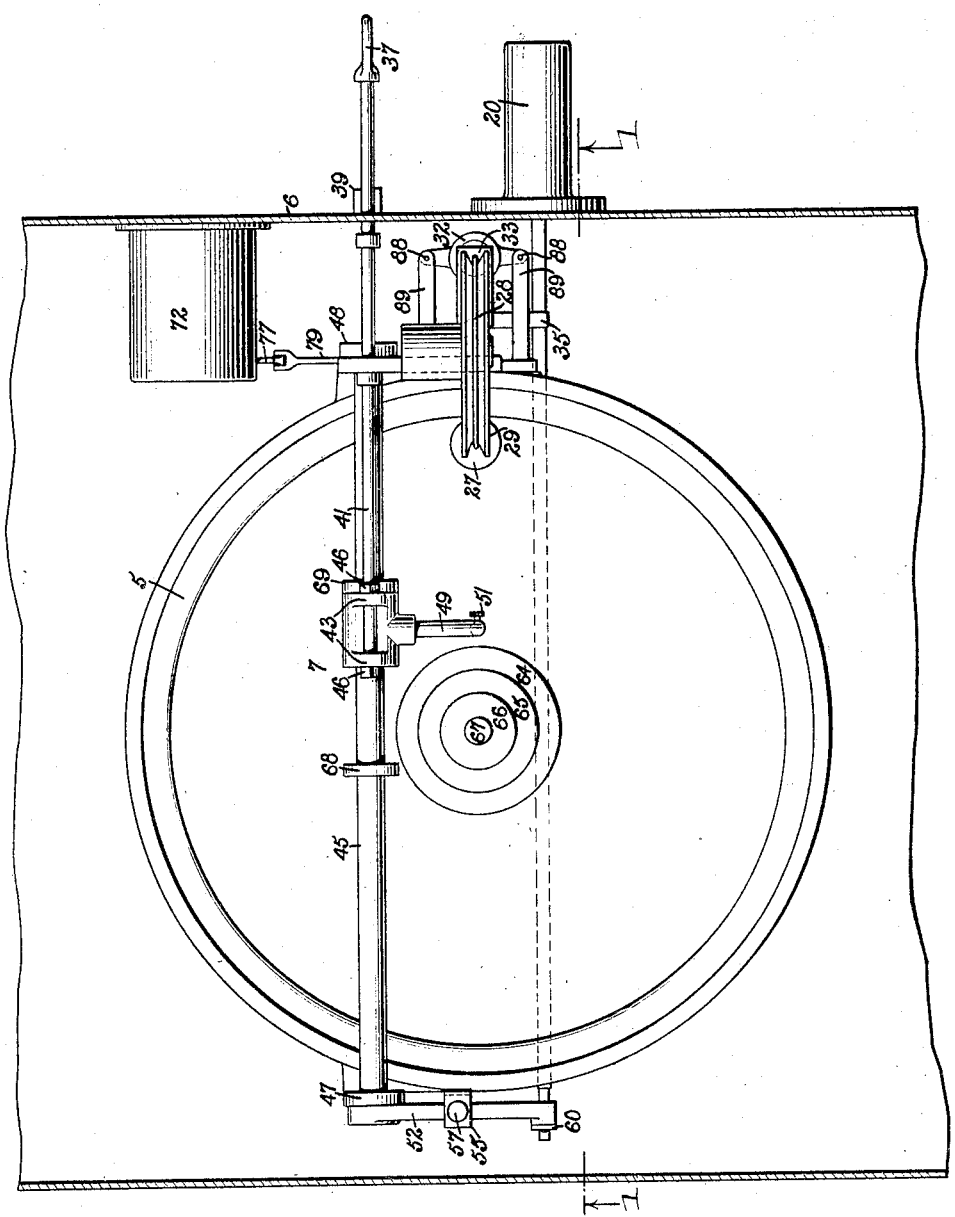

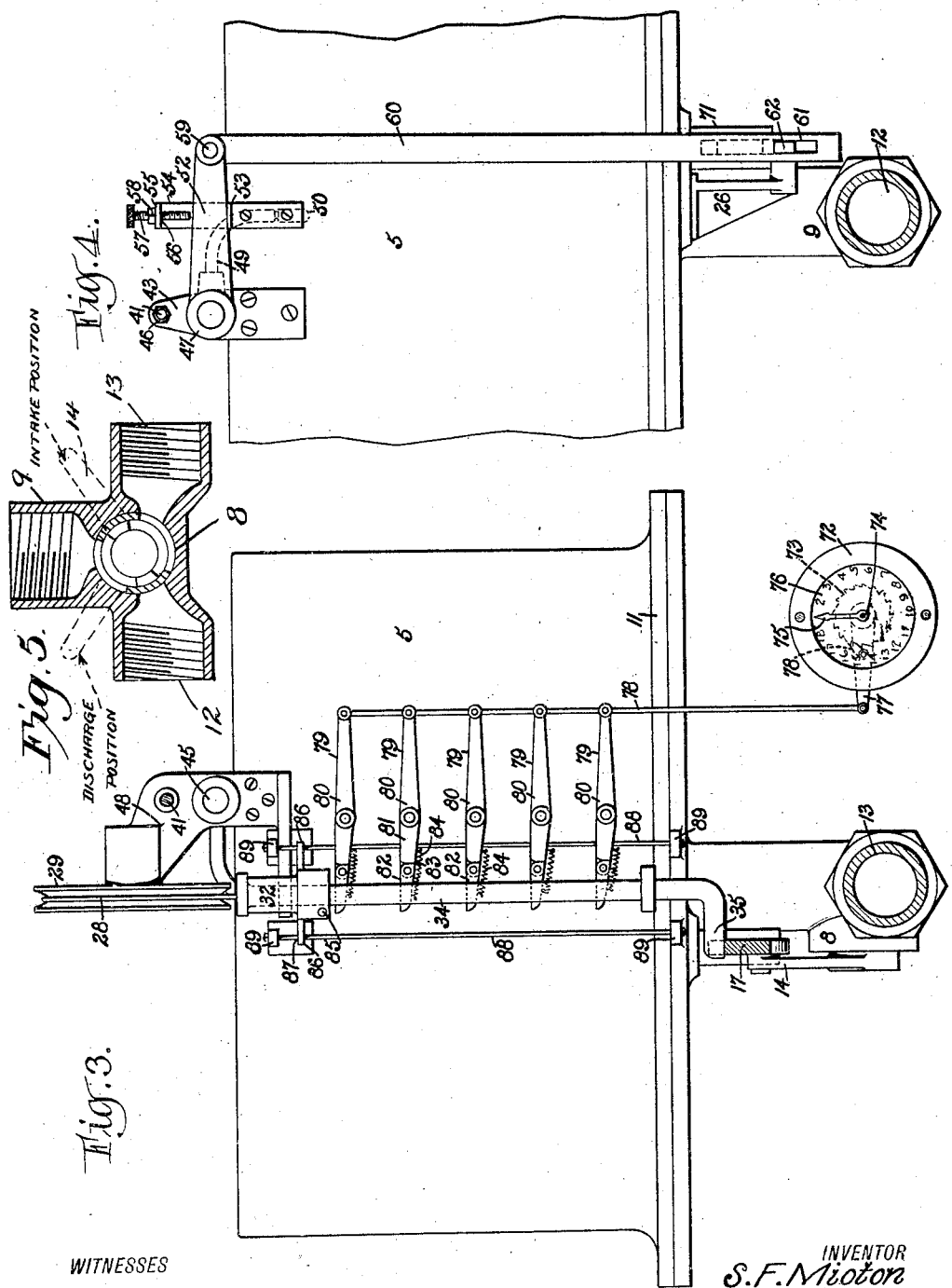

UNITED STATES PATENT OFFICE.

SIDNEY FITZHUGH MIOTON, OF NEW ORLEANS, LOUISIANA.

FLUID-MEASURING MACHINE.

1,382,439.      Specification of Letters Patent.      Patented June 21, 1921.

Application filed June 15, 1917. Serial No. 174,880.

*To all whom it may concern:*

Be it known that I, SIDNEY F. MIOTON, a citizen of the United States, and a resident of New Orleans, in the parish of Orleans and State of Louisiana, have invented a new and Improved Fluid-Measuring Machine, of which the following is a full, clear, and exact description.

My invention has for its object to provide a fluid measuring machine which will accurately measure fluids, the construction being such that when the machine has been once actuated, the measuring process must be fully completed before the machine may be actuated a second time.

Another object of the invention is to provide the machine with means by which different quantities of fluid may be measured, it being possible to adjust the means to measure a larger or smaller quantity, provided that the amount desired is more than may be contained in the measuring cylinder at the time.

Still another object of the invention is to provide a register for indicating the amount of fluid which has passed through the measuring cylinder.

Additional objects of the invention will appear in the following specification in which the preferred form of the invention is disclosed.

In the drawings similar reference characters denote similar parts in all the views, in which—

Fig. 2 is a plan view of Fig. 1 showing the casing in section;

Fig. 3 is a sectional view on the line 3—3 of Fig. 1;

Fig. 4 is a sectional view on the line 4—4 of Fig. 1, and

Fig. 5 is a vertical longitudinal section through the valve.

Figure 1:
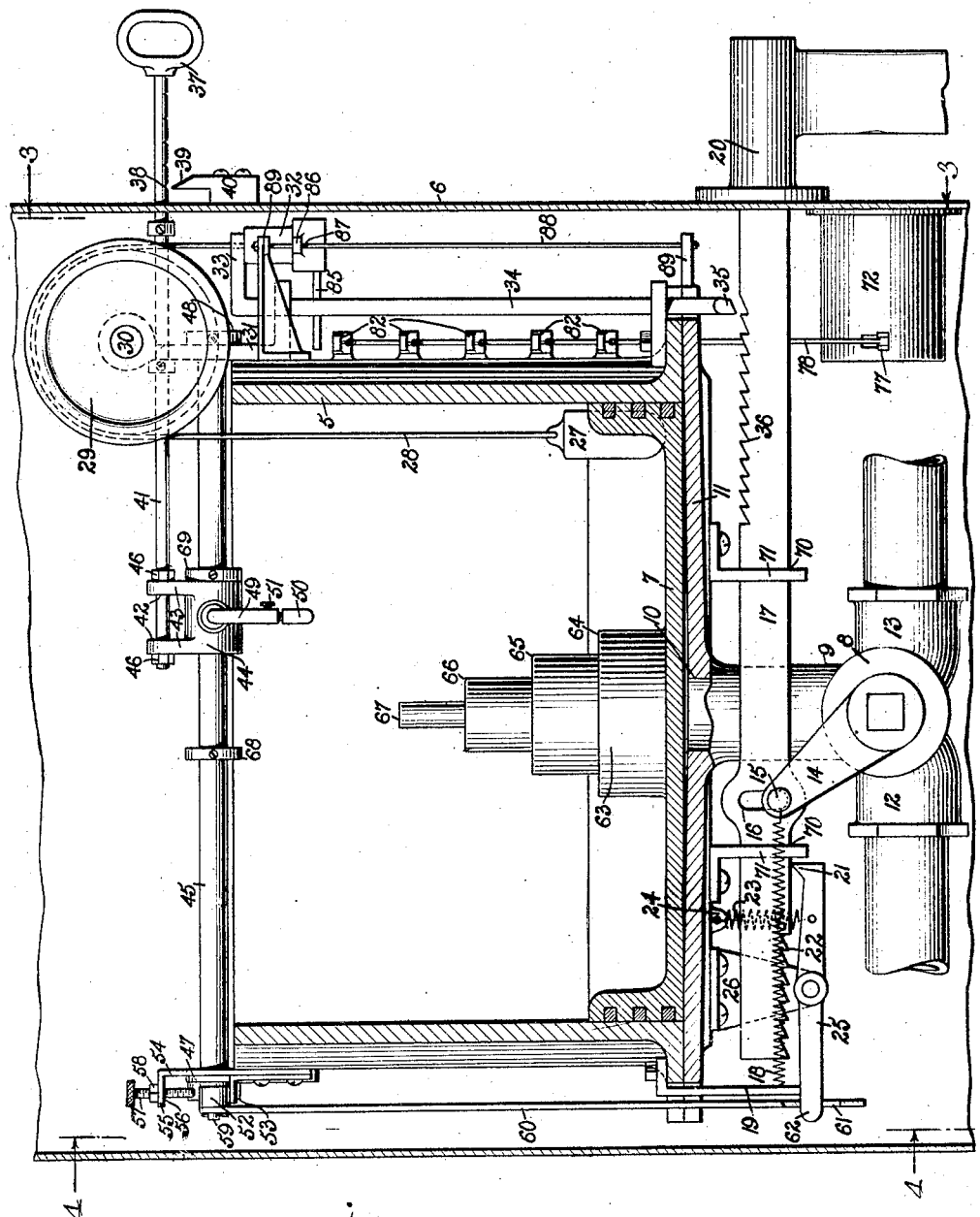
Figure 1 is a sectional view on the line 1—1 of Fig. 2.

By referring to the drawings, it will be seen that a measuring cylinder 5 is disposed within a casing 6, a piston 7 being movably disposed in the measuring cylinder 5. A three-way valve 8 of the character shown in Fig. 5 has a port 9 for communicating with the interior of the measuring cylinder 5 through an opening 10 in the cylinder head 11. It will also be seen that a port 12 of the three-way valve 8 leads from the fluid supply, and a port 13 leads to an outlet. It is therefore possible by means of the three-way valve 8 to connect the port 12 with the port 9 to supply the measuring cylinder 5 with a quantity of fluid, and by operating the three-way valve 8 to close the port 12 and connect the port 9 with the port 13 to permit the fluid contained in the measuring cylinder 5 to flow to the outlet.

The three-way valve 8 has an operating arm 14 which is provided with a pin 15 disposed in a slot 16 in an operating bar 17, a spring 18 connecting the pin 15 with a bracket 19 secured to the measuring cylinder 5 for holding the operating bar 17 and the valve arm 14 in a position where the port 9 of the three-way valve 8 will communicate with the outlet 13 to operate the machine. The operating bar 17 is pulled to the right from the position indicated in Fig. 1 of the drawings by a handle 20, and when this is done the three-way valve 8 will be operated by its arm 14 to close the port 13 and open communication between the port 12 and the port 9. With this movement of the operating bar 17, a pawl 21 will be brought into engagement with ratchet teeth 22 to prevent a return movement of the operating bar 17 until the pawl 21 is freed from the said ratchet teeth 22. This pawl 21 is held in engagement with the ratchet teeth 22 by means of a spring 23 which connects the pawl 21 with a bracket 24 secured to the cylinder head 11. The pawl 21 is mounted on a lever 25 which is fulcrumed to a bracket 26 which is also secured to the cylinder head 11. With the flow of the fluid into the measuring cylinder 5 between the cylinder head 11 and the piston 7, the piston 7 is moved away from the cylinder head and with this movement of the piston away from the cylinder head, it will raise the weight 27 which rests on the top of the piston. This weight 27 is secured to a cord 28 disposed around a pulley 29 pivoted at 30 to a member 31 secured to the measuring cylinder, the other terminal of the cord 28 being secured to a counterweight 32. This counterweight 32 engages and holds upwardly an arm 33 of a bar 34 when the piston 7 is disposed against the cylinder head 11; but with the upward movement of the piston 7 carrying the weight 27, the counterweight 32 descends, thereby permitting the arm 33 with its bar 34 to descend. The bar 34 has a tooth 35 which with the descent of the bar 34 engages ratchet teeth 36 on the operating bar 17, the said ratchet teeth 36 having been moved to the right with the operating bar, as has been stated. The engagement of the tooth 35 with one of the ratchet teeth 36 will prevent a further outward movement of the operating bar 17. It will therefore be seen that when the three-way valve 8 is operated to permit the fluid to flow into the measuring cylinder, the operating bar 17 is prevented from movement to the left by the pawl 21; and that when a small quantity of fluid flows into the measuring cylinder 5 the operating bar 17 is prevented from further movement to the right by the engagement of the tooth 35 with one of the ratchet teeth 36. It will thus be understood that the engagement of the pawl 35 with the ratchet teeth 36 prevents the operator, who has measured out one or more gallons of fluid, from manipulating the valve by pulling the handle outwardly before all of the fluid has flowed from the measuring cylinder 5 and while a portion of the fluid remains in the measuring cylinder, so as to avoid short delivery in substantially the same way the pawl 21 and ratchet teeth 22 operate to prevent short measure. It is obvious that if the operator could effect a short delivery by manually shifting the valve to register with the fluid inlet before the cylinder piston has fallen to its lowermost position, he might then cheat one customer and receive payment for the amount remaining in the tank from the next subsequent customer.

The quantity of fluid which is to be measured having been decided upon, a key 37 is moved to a position where one of the notches 38 thereon will register with the point 39 on a bracket 40 secured to the casing 6. The shank of the key 37 is secured to a rod 41 which is disposed in orifices 42 in members 43 of a sleeve 44 keyed to a rock shaft 45. The position of the sleeve 44 relatively to the length of the notches 38 in the key 37 may be adjusted by means of nuts 46 which mesh with threads on the rod 41, and which are disposed at the outer sides of the members 43. The rock shaft 45 is journaled in bearings 47 and 48. At one side of the sleeve 44 there is a depending finger 49 which has an adjustable extension 50 which is held in adjusted position relatively to the body of the finger 49 by means of a set screw 51, all in a manner which will be readily understood. To one end of the rock shaft 45 there is secured a lever 52 which normally rests against a seat 53 on a bracket 54 secured to the measuring cylinder 5. The bracket 54 has a flange 55 spaced above the seat 53, provided with threaded orifices 56 in which a screw 57 meshes, the screw 57 being held in adjusted position by means of a set screw 58. This screw 57 serves to limit the upward movement of the lever 52. Articulated to the lever 52 at 59 there is a rod 60 which is provided with an opening 61 in which an arm 62 of the lever 25 is disposed, it being understood that by a rocking movement of the shaft 45 the arm 52 may be raised, and with it the rod 60 to operate the lever 25 to disengage the pawl 21 from the ratchet teeth 22; and that when the pawl 21 is disengaged as stated, the spring 18 will serve to move the operating bar 17 and with it the arm 14 of the three-way valve 8 to normal position, as shown in Fig. 1 of the drawings.

Mounted on the piston 7 there is a member 63 having seats 64, 65, 66 and 67, the said seats being arranged as steps, with each seat disposed nearer the common center of the axis of the member 63 than is the seat disposed immediately below. These seats are provided for engaging the extension 50 of the finger 49 for rocking the sleeve 44, and with it the shaft 45, it being understood that when the sleeve is disposed so that the finger will be engaged by the seat 66, the shaft 45 will be rotated when the piston 7 which carries the member 63 has moved only a short distance away from the measuring cylinder head 11; but when the sleeve 44 is disposed to position the finger for engagement with the seat 64 the piston 7 will move a greater distance from the head 11 before it engages the finger to rock the sleeve. By the movement of the sleeve 44 longitudinally of the shaft 45 it is possible to adjust the machine for measuring a predetermined quantity of fluid. The longitudinal movement of the sleeve 44 on the shaft 45 is limited by collars 68 and 69 which are mounted on the shaft and are secured thereto, the collar 68 being disposed to limit the movement of the sleeve 44 to the left, and thereby prevent the passage of the finger to the left beyond the seat 67. This makes it impossible to adjust the sleeve to measure a quantity of fluid less than the amount of fluid already contained in the measuring cylinder, for should a quantity of fluid be contained in the measuring cylinder sufficient to raise the piston 7 and with it the member 63 to dispose the seat 65 in operative position, the sleeve 44 cannot be moved to the left beyond a point where the finger engages the seat 65, for the finger will strike the member 63 between the seats 65 and 66, which will act as a stop. In a similar manner, the sleeve 44 will engage the member 63 at the side of the seat 65 when the finger is positioned at the seat 64. The collar 68 secured to the shaft 45 is positioned to be engaged by the sleeve 44, and act as a stop when the finger is positioned for engagement by the seat 67.

From the foregoing it will be clearly understood that after the operating bar 17, which is supported in guideways 70 in brackets 71 secured to the cylinder head 11, is pulled outwardly by means of the handle 20, its return movement is prevented by means of the pawl 21 until the desired quantity of fluid has been measured; and when the sleeve 44 is positioned, and with it its finger by means of the handle 37 to measure a predetermined quantity of fluid, and the handle is drawn out, the fluid will pass into the measuring cylinder 5, and will raise the piston 7. Immediately after the piston moves upwardly and away from the measuring cylinder head 11, the tooth 35 is permitted to fall by the means which have been described, and engages one of the ratchet teeth 36. This prevents the further outward movement of the bar 17, and the said bar 17 is therefore prevented from movement in either direction until one of the seats 64, 65, 66 or 67 engages the finger to rock the sleeve 44, and with it its rock shaft, which by the means described will raise the arm 62 of the lever 25 and disengage the pawl 21 from the ratchet teeth 22, with which it has been engaged. When this operation has taken place the spring 18 serves to return the operating bar 17 to the position indicated in Fig. 1 of the drawings, and this movement will move the arm 14 of the three-way valve 8 to connect the measuring cylinder with the outlet port in the said valve.

The amount of fluid which has been measured is indicated by a register 72 which has a ratchet wheel 73 secured to a shaft 74 to which a hand 75 is also secured. This hand 74, together with a dial 76, indicates the amount of fluid which has been measured. Freely mounted on the shaft 74 there is an arm 77 to which a pawl 78 is pivoted, the said pawl 78 engaging the ratchet wheel 73 to rotate the latter. Articulated to the arm 77 there is a rod 78 to which are articulated arms 79 of levers 80, the said levers 80 being fulcrumed one above the other distances corresponding to the distances of the seats 64, 65, 66 and 67 from the piston 7. Pivoted to the other arms 81 of the levers 80 there are fingers 82, the downward movement of the said fingers 82 relatively to the arms 81 being limited by shoulders 83, the said fingers 82, however, being permitted to move upwardly relatively to the said arms. Springs 84 are provided for holding the fingers 82 downwardly in the positions indicated in Fig. 3 of the drawings. The said fingers 82 are disposed for engagement by a pin 85 secured to the counterweight 32, the said counterweight when it descends carrying the pin 85, and this pin 85 pressing against the fingers 82 to operate the levers 80 one at a time. With the operation of each lever, the rod 78 will be raised to operate the ratchet wheel 73 through the arm 77, and with this step by step movement of the ratchet wheel the hand 75 will be rotated relatively to the dial 76. In order to direct the downward movement of the counterweight 32, flanges 86 are secured to the counterweight, these flanges 86 having orifices 87 in which rods 88 are disposed, the rods 88 being secured to brackets 89 which in turn are secured to the measuring cylinder.

Having thus described my invention, I claim as new and desire to secure by Letters Patent:

1. In a fluid measuring device, a measuring cylinder, a valve having a port connected with the interior of the measuring cylinder, a piston in the measuring cylinder, an operating bar provided with a handle and connected with the valve for operating the latter, means to prevent a return movement of the bar after it has moved to operate the valve until the piston reaches a predetermined point in the cylinder, and means to prevent a forward movement of the bar when there is a substantial quantity of fluid in the measuring cylinder.

2. In a fluid measuring device, a measuring cylinder, a three-way valve having a port connected with the interior of the measuring cylinder, an inlet port and an outlet port, means to prevent a movement of the valve to connect the first port with the outlet port until a predetermined quantity of fluid is contained in the measuring cylinder, and means to prevent a movement of the valve to connect the first port with the inlet port while there is a substantial quantity of fluid in the measuring cylinder.

3. In a fluid measuring machine, a measuring cylinder, a manually opening and mechanically closing three-way valve having a port connected with the interior of the cylinder, and an outlet port, a piston in the measuring cylinder, and means to prevent manual movement of the valve toward open position after it is once opened to any extent and has caused movement of the piston, until the piston has completed its movement in both directions due to the filling and emptying of the cylinder.

4. In a fluid measuring machine, a measuring cylinder, a manually opening and mechanically closing valve having a port connected with the interior of the measuring cylinder, a piston in the measuring cylinder, a manually actuated, spring controlled operating bar connected with the valve for opening the latter, and means to prevent movement of the bar in either direction after it is moved to operate the valve until the piston reaches a predetermined point in the cylinder.

5. In a fluid measuring machine, a measuring cylinder, a manually opening and mechanically closing valve having a port connected with the interior of the measuring cylinder, a piston in the measuring cylinder, a manually actuated, spring controlled operating bar connected with the valve for opening the latter, and means to limit the movement of the bar in either direction after once operated during the period that the piston is between predetermined points in the measuring cylinder.

6. In a fluid measuring machine, a measuring cylinder, a manually opening and mechanically closing valve having a port communicating with the interior of the measuring cylinder, a piston in the measuring cylinder, a manually actuated, spring controlled operating bar connected with the valve for opening the latter, means to prevent the movement of the bar in one direction after it is once operated to open communication with the interior of the measuring cylinder, and means to prevent a movement of the bar in the other direction during the period that the piston is beyond a predetermined point in the measuring cylinder.

7. In a fluid measuring machine, a measuring cylinder, a manually opening and mechanically closing valve having a port communicating with the interior of the measuring cylinder, a piston in the measuring cylinder, a manually actuated, spring controlled operating bar connected with the valve for opening the latter, means to prevent the movement of the bar in one direction after it is once operated to open communication with the interior of the measuring cylinder, means to prevent a movement of the bar in the other direction during the period that the piston is beyond a predetermined point in the measuring cylinder, and means to move the operating bar in the first mentioned direction when the piston is disposed at a predetermined point in the measuring cylinder.

8. In a fluid measuring machine, a measuring cylinder, a valve having a port connected with the interior of the measuring cylinder, a piston in the measuring cylinder, an operating bar connected with the valve for operating the latter, means to prevent the return movement of the bar after it is once moved to operate the valve, a rock shaft having a projection adjustable therealong, a stepped member carried by the piston for engaging the projection to rock the shaft, and means for freeing the bar from the first mentioned means operable by the rock shaft.

9. In a fluid measuring machine, a measuring cylinder, a valve having a port connected with the interior of the measuring cylinder, a piston in the measuring cylinder, an operating bar connected with the valve for operating the latter and provided with ratchet teeth, a pawl for engaging the ratchet teeth to limit the movement of the bar after it is moved to operate the valve, a rock shaft having a projection adjustable therealong, means operable by the rock shaft to free the pawl from the ratchet teeth, and a member carried by the piston for engaging the projection on the rock shaft to rock the latter and having engaging faces at different levels to which the projection is selectively movable.

10. In a fluid measuring machine a measuring cylinder, a valve having a port connected with the interior of the measuring cylinder, an operating bar connected with the valve for operating the latter and provided with two sets of ratchet teeth, a pair of members for engaging the ratchet teeth to prevent movement of the bar after it is moved to operate the valve, a rock shaft having a projection, a lever secured to the rock shaft, a bar carried by the lever and having a shoulder engaging one of said members for operating the latter, means carried by the piston for engaging the projection on the rock shaft to rock the latter and piston controlled means for operating the other of said members as described.

11. In a fluid measuring machine, a measuring cylinder, a valve having a port connected with the interior thereof, a piston in the measuring cylinder, an operating bar connected with the valve for operating the latter and provided with ratchet teeth, a second bar having a tooth for engaging the ratchet teeth, a pulley, a cord disposed over the pulley, a weight secured to one terminal of the cord, and resting on the piston, and a counterweight secured to the other terminal of the cord and disposed under a member of the second bar for normally holding the tooth on the second mentioned bar out of engagement with the ratchet teeth.

12. In a fluid measuring machine, a measuring cylinder, a valve having a port communicating with the interior of the measuring cylinder, a piston in the measuring cylinder, an operating bar provided with ratchet teeth and connected with the valve for operating the latter, means to prevent the return movement of the bar after it is moved to operate the valve, a rock shaft having a projection, a member carried by the piston for engaging the projection to rock the shaft, means for freeing the bar from the first mentioned means operable by the rock shaft, a second bar having a tooth for engaging the ratchet teeth on the first mentioned bar, a pulley, a cord disposed over the pulley, a weight secured to one terminal of the cord and resting on the piston, and a counterweight secured to the other terminal of the cord and disposed under a member on the second mentioned bar for normally holding the tooth of the second mentioned bar out of engagement with the ratchet teeth.

13. In a fluid measuring machine, a measuring cylinder, a piston in the measuring cylinder, a valve having a port communicating with the interior of the cylinder, means to lock the valve against movement in one direction, a member on the piston having seats spaced apart and disposed at different distances from the body of the piston, means to free the first mentioned means, and a trip adjustable on the second mentioned means for engagement by a predetermined seat on the member to operate the second mentioned means.

14. In a fluid measuring machine, a measuring cylinder, a piston in the cylinder, a valve having a port communicating with the interior of the measuring cylinder, means to lock the valve against movement in one direction, a member mounted on the piston and having seats disposed at different distances from the body of the piston, a rock shaft, a trip keyed to the rock shaft and movable longitudinally thereof for engagement by a predetermined seat, and means to free the first mentioned means operable by the rock shaft.

15. In a fluid measuring machine, a measuring cylinder, a valve having a port communicating with the interior of the measuring cylinder, a piston in the measuring cylinder, an operating bar connected with the valve and provided with ratchet teeth, means to lock the operating bar against movement in one direction, a member mounted on the piston and having seats disposed at different distances from the body of the piston, a rock shaft, a trip keyed to the rock shaft and movable longitudinally thereof for engagement by a predetermined seat, means to free the first mentioned means operable by the rock shaft, a second bar having a tooth for engaging the ratchet teeth to prevent the movement of the operating bar in the other direction, a pulley, a cord disposed over the pulley, a weight secured to one terminal of the cord and resting on the piston, and a counterweight secured to the other terminal of the cord and disposed under a member on the second bar for normally holding the tooth on the second bar out of engagement with the ratchet teeth.

16. In a fluid measuring machine, a measuring cylinder, a valve having a port communicating with the interior of the measuring cylinder, a piston in the measuring cylinder, an operating bar connected with the valve for operating the latter and provided with ratchet teeth, a pawl for engaging the ratchet teeth to limit the movement of the operating bar after it is once moved to operative position, a member mounted on the piston and having seats disposed at different distances from the body of the piston, a rock shaft, a trip keyed to the rock shaft and movable longitudinally thereof for engagement by a predetermined seat on the member, and means operable by the rock shaft to free the pawl from the ratchet teeth.

17. In a fluid measuring machine, a measuring cylinder, a piston in the measuring cylinder, a valve having a port communicating with the interior of the measuring cylinder, a manually actuated spring controlled bar having two sets of ratchet teeth and connected with the valve for operating the latter, a pawl for engaging one set of ratchet teeth to prevent a movement of the bar in one direction, a pawl for engaging the other ratchet teeth to prevent the movement of the bar in the other direction, both of said pawls being engaged during outward movement of the piston, means controllable by the piston for freeing one pawl from engagement with one set of ratchet teeth at the end of its outward movement, and means controlled by the piston to prevent disengagement of the other pawl from the other ratchet teeth until the piston reaches its normal inner position.

18. In a fluid measuring machine, a measuring cylinder, a piston in the cylinder, a valve having a port communicating with the interior of the measuring cylinder, a manually actuated spring controlled bar having two sets of ratchet teeth and connected with the valve for operating the latter, a pawl for engaging one set of ratchet teeth to prevent the movement of the bar in one direction, a pawl for engagement with the other set of ratchet teeth to prevent the movement of the bar in the opposite direction, means to bring one pawl into engagement with its ratchet teeth, means to free the other pawl from engagement with its ratchet teeth, and means controllable by the piston to first actuate the first-mentioned means and subsequently to actuate the second mentioned means during the first movement of each complete operation of the piston.

19. In a fluid measuring cylinder, a measuring cylinder, a piston in the measuring cylinder, a valve having a port communicating with the interior of the measuring cylinder, a manually actuated spring-controlled bar having two sets of ratchet teeth and connected with the valve for operating the latter, a pawl for engaging one set of ratchet teeth to prevent the return movement of the operating bar after it is once operated, a pawl for engaging the other set of ratchet teeth to prevent the further forward movement of the operating bar, means to move the second mentioned pawl into engagement with its ratchet teeth, means to free the first mentioned pawl from engagement with its ratchet teeth, and means controllable by the piston to first actuate the first mentioned means and subsequently actuate the second mentioned means during the first movement of each complete operation of the piston.

20. In a fluid measuring machine, a measuring cylinder, a piston in the measuring cylinder, a valve having a port communicating with the interior of the measuring cylinder, a bar having two sets of ratchet teeth and connected with the valve for operating the latter, a pawl for engaging one set of ratchet teeth to prevent the movement of the bar in one direction, a pawl for engaging the other set of ratchet teeth to prevent the movement of the bar in the opposite direction, a member mounted on the piston and having seats spaced apart and disposed at different distances from the body of the piston, means adjustable relatively to the measuring cylinder for engagement by a predetermined seat on the member for freeing one pawl from engagement with its ratchet teeth, and additional means controllable by the piston for moving the other pawl into engagement with its ratchet teeth.

21. In a fluid measuring machine, a measuring cylinder, a piston therein, a manually opening and mechanically closing valve having a port communicating with the interior of the measuring cylinder, a member mounted on the piston and having seats spaced apart at different distances from the piston, a rock shaft, a trip keyed to the rock shaft and movable longitudinally of the rock shaft for engagement by a predetermined seat, means for closing the valve controlled by the rock shaft, and a key secured to the trip and having marks indicated thereon for determining the position of the trip relatively to the path of movement of the member mounted on the piston.

22. In a fluid measuring machine, a measuring cylinder, a piston therein, a valve having a port connected with the interior of the measuring cylinder, a rock shaft, means for operating the valve in one direction, means operated by the rock shaft for controlling the valve operating means, a trip keyed to the rock shaft and movable longitudinally thereof, a member mounted on the piston and having a plurality of seats in the form of steps for engaging the trip, and means to limit the movement of the trip longitudinally of the rock shaft.

23. In a fluid measuring machine, a measuring cylinder, a piston therein, a valve having a port communicating with the interior of the measuring cylinder, a rock shaft, means for closing the valve, means for controlling the first mentioned means operable by the rock shaft, a trip keyed to the shaft and movable longitudinally thereof, and a member on the piston for engaging the trip to operate the latter and which has surfaces for engaging the trip and is shiftable into the path of movement of the trip to prevent the movement of the trip to a position for measuring a quantity of fluid greater than already contained in the measuring cylinder and disposed against the piston.

24. In a fluid measuring machine, a measuring cylinder, a piston therein, a valve with a port communicating with the interior of the measuring cylinder, a trip movable across the cylinder, means for operating the valve, means for controlling the first mentioned means and in turn actuated by the trip, and a member on the piston for engaging the trip to operate the latter and which has surfaces for engaging the trip and is shiftable into the path of movement of the trip to prevent the movement of the trip to a position for measuring a quantity of fluid greater than already contained in the measuring cylinder and disposed against the piston.

25. In a fluid measuring machine, a measuring cylinder having an intake and discharge, a piston in the measuring cylinder, a valve controlling the intake and discharge and manually shiftable in one direction to the intake position, means to prevent movement of the valve in the opposite direction while the cylinder is filling, means to prevent further movement of the valve toward the intake position while the cylinder is filling and discharging, and means operable by the piston to first release the first-mentioned means and subsequently release the last-mentioned means.

26. In a fluid measuring machine, a measuring cylinder having an intake and discharge, a piston in the measuring cylinder, a valve controlling the intake and discharge and manually shiftable in one direction to the intake position, means to prevent movement of the valve in the opposite direction while the cylinder is filling, means to prevent further movement of the valve toward the intake position while the cylinder is filling and discharging, and means operable by the piston to first release the first-mentioned means and subsequently release the last-mentioned means, and means to return the valve to the primary position upon release of the said first-mentioned means.

27. In a fluid measuring machine, a measuring cylinder, a piston therein, a valve having a port communicating with the interior of the measuring cylinder, means to lock the valve against movement in one direction, a member mounted on the piston having seats arranged as steps spaced at different distances from the piston, and means controlled by said member to release the said valve-locking means, including a member movable across the cylinder and having a trip, and the movement of which latter member is limited by the first member adjacent to a trip-engaging seat when the first member is in the path of shifting movement of the second member.

28. In a fluid measuring machine, a measuring cylinder, a valve having a port connected with the interior of the measuring cylinder, a piston in the measuring cylinder, an operating bar provided with a handle and connected with the valve for operating the latter, means to prevent the return movement of the bar after it is first moved to operate the valve, a rock shaft having a projection, a member carried by the piston for engaging the projection to rock the shaft, and means for freeing the bar from the first mentioned means operable by the rock shaft.

29. In a fluid measuring machine, a measuring cylinder having an intake and discharge, a piston in the measuring cylinder, a valve controlling the intake and discharge and manually shiftable in one direction to the intake position, means to lock the valve against movement in either direction after initial movement of the piston in the filling of the tank, piston controlled means for releasing the valve for movement to the discharge position when the piston is at the end of the filling movement, and piston controlled means for releasing the valve for movement to the intake position when the piston is at the end of the discharge movement.

30. Instrumentalities for automatically stopping the flow of fluid at a predetermined time, comprising a fluid inlet valve, with means movable to open the valve and operatively associated means to hold it open; a receiver for the fluid flowing through the opened valve, means in a normal position in the receiver, displaced as the fluid flows in, including a stepped engaging member; and an engageable member adjustable over said stepped engaging member, with connecting means to the aforesaid holding means, to actuate said holding means and release the valve operating means to permit the valve to close, when said engageable member is engaged by a predetermined one of the steps of said graduated engaging member.

31. A fluid measuring receiver open at the top, a valve arranged to be opened to admit fluid from the bottom, a follower piston normally on the bottom of the receiver, displaced by the inflowing fluid, and fluid quantity gaging means including instrumentalities operatively associated with the receiving tank for enabling the reverse movement of the valve when a predetermined quantity of fluid flows into the receiver, said means and instrumentalities including a stepped pyramid on the follower piston projectable out of the top of the receiver, a rock rod operatively mounted on the receiver at one side of the center, adjustable means operatively associated with the pyramid for gaging the quantity of fluid to be supplied, and operating connection between said rock rod and said valve for enabling the actuation of the valve when the aforesaid rod is rocked.

SIDNEY FITZHUGH MIOTON.